United States Patent [19]
Okamoto et al.

[11] Patent Number: 6,020,446
[45] Date of Patent: Feb. 1, 2000

[54] CURABLE COMPOSITION

[75] Inventors: Toshihiko Okamoto; Makoto Chiba, both of Kobe; Masashi Sakaguchi, Kakogawa; Junji Takase, Akashi, all of Japan

[73] Assignee: Kaneka Corporation, Osaka, Japan

[21] Appl. No.: 09/125,630

[22] PCT Filed: Feb. 12, 1997

[86] PCT No.: PCT/JP97/00357

§ 371 Date: Oct. 22, 1998

§ 102(e) Date: Oct. 22, 1998

[87] PCT Pub. No.: WO97/31032

PCT Pub. Date: Aug. 28, 1997

[30] Foreign Application Priority Data

Feb. 21, 1996 [JP] Japan .................................. 8-033931
Sep. 25, 1996 [JP] Japan .................................. 8-252142

[51] Int. Cl.$^7$ ...................................................... C08F 30/08
[52] U.S. Cl. ......................... 526/279; 525/100; 525/105; 525/106; 525/479; 528/26; 528/34
[58] Field of Search ..................................... 525/479, 105, 525/106, 100; 526/279; 528/34, 26

[56] References Cited

U.S. PATENT DOCUMENTS 5,106,908  4/1992  Alsmarraie et al. .................... 525/479
5,731,379  3/1998  Kennan et al. ......................... 526/279

FOREIGN PATENT DOCUMENTS 8-41138  2/1996  Japan ............................. C08F 275/00
8-41357  2/1996  Japan ............................. C08L 101/10

*Primary Examiner*—Melvyn I. Marquis
*Attorney, Agent, or Firm*—Pollock, Vande Sande & Amernick

[57] ABSTRACT

It is an object of the invention to improve the adhesive property of a curable composition mainly comprising a reactive silyl group-containing saturated hydrocarbon polymer when applied to various adherends and to improve the weathering-resistant adhesive property of said composition when applied to various glass products, in particular heat ray-reflecting glass products.

The present invention relates to a curable composition which comprises (A) a saturated hydrocarbon polymer containing at least one silicon-containing group having a hydroxyl group or hydrolyzable group bound to the silicon atom and capable of crosslinking by forming a siloxane bond, (B) a silane coupling agent and (C) a compound containing, within the molecule thereof, an unsaturated group capable of polymerizing upon reaction with atmospheric oxygen and/or a photopolymerizing substance.

12 Claims, No Drawings

CURABLE COMPOSITION

TECHNICAL FIELD

The present invention relates to a curable composition improved in weathering-resistant adhesive property and useful as sealants for double layer glass and building materials or as adhesives, among others.

BACKGROUND ART

It is known that saturated hydrocarbon polymers having at least one silicon-containing group having a hydroxyl or hydrolyzable group bonded to the silicon atom and capable of crosslinking by forming a siloxane bond (hereinafter said silicon-containing group is referred to as "reactive silyl group") have interesting properties in that, even at room temperature, they can be crosslinked through siloxane bond formation involving moisture-caused hydrolysis of the reactive silyl group to give rubber-like cured products. Therefore, they can be effectively used as sealants for double layer glass products and as elastic sealants for building materials, for instance.

Sealants for double layer glass products are required to be excellent in nonprimer adhesive property, namely to be capable of firmly adhering to various adherends without applying any primer. In recent years, it has been demanded that not only sealants for double layer glass products but also sealants for building materials be capable of firmly adhering to adherends in the nonprimer state so that the efficiency on the side of constructors can be improved. However, when the above-mentioned reactive silyl group-containing saturated hydrocarbon polymers are used, the adhesive property in the nonprimer state is unsatisfactory.

Furthermore, it is required that sealants to be used around or in contact with glass, for example sealants for double layer glass products be excellent especially in weathering-resistant adhesive property. However, when the above-mentioned reactive silyl group-containing saturated hydrocarbon polymers are used, they show rather unsatisfactory weathering-resistant adhesive property. In particular, they have a problem in that they are insufficient in weathering-resistant adhesive property especially when used in heat ray-reflecting glass products recently used in many instances and showing high heat insulation characteristics.

SUMMARY OF THE INVENTION

It is an object of the invention to improve the adhesive property of a curable composition mainly comprising a reactive silyl group-containing saturated hydrocarbon polymer when applied to various adherends and to improve the weathering-resistant adhesive property of said composition when applied to various glass products, in particular heat ray-reflecting glass products.

The present inventors made intensive investigations in an attempt to solve such problems and, as a result, found that the adhesive property and weathering-resistant adhesive property of such composition can be improved by adding a certain specific compound to the polymer, without deteriorating or otherwise adversely affecting the physical properties of the cured product. The problems mentioned above have thus been solved and the present invention has now been completed.

Thus, the present invention relates to a curable composition which comprises (A) a saturated hydrocarbon polymer containing at least one reactive silyl group, (B) a silane coupling agent and (C) a compound containing, within the molecule thereof, an unsaturated group capable of polymerizing upon reaction with atmospheric oxygen and/or a photopolymerizing substance. In particular, it relates to a curable composition improved in weathering-resistant adhesive property which comprises (A) 100 parts by weight of a saturated hydrocarbon polymer containing, within the molecule thereof, at least one reactive silyl group and having a molecular weight of 500 to 50,000, (B) 0.1 to 20 parts by weight of an isocyanate group-containing silane coupling agent and/or an epoxy group-containing silane coupling agent and (C) 0.1 to 20 parts by weight of a drying oil and/or a photopolymerizing substance.

DETAILED DESCRIPTION OF THE INVENTION

In the following, the present invention is described in detail.

The reactive silyl group-containing saturated hydrocarbon polymer to be used in the practice of the present invention is a polymer substantially free of carbon-carbon unsaturated bonds other than aromatic rings. For examples, there may be mentioned polyethylene, polypropylene, polyisobutylene, hydrogenated polybutadiene, and hydrogenated polyisoprene.

As the reactive silyl group, there may be mentioned groups of the general formula

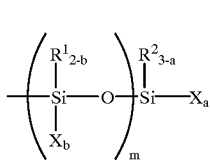

(1)

(wherein $R^1$ and $R^2$ each independently is an alkyl group containing 1 to 20 carbon atoms, an aryl group containing 6 to 20 carbon atoms, an aralkyl group containing 7 to 20 carbon atoms or a triorganosiloxy group of the formula $(R')_3SiO-$ (wherein each of R's is independently a substituted or unsubstituted hydrocarbon group containing 1 to 20 carbon atoms); each of X's is independently a hydroxyl group or a hydrolyzable group: a is 0, 1, 2 or 3 and b is 0, 1 or 2, exclusive of the case where a and b are simultaneously equal to 0; and m is 0 or an integer of 1 to 19).

As the hydrolyzable group, there may be mentioned, for example, a hydrogen atom, alkoxyl groups, acyloxy groups, ketoximate groups, an amino group, an amido group, an aminoxy group, a mercapto group, alkenyloxy groups and like groups in general use.

Among them, alkoxyl, amido and aminoxy groups are preferred and, from the viewpoint of mild hydrolyzability and ease in handling, alkoxyl groups are most preferred.

As regards the hydrolyzable groups and hydroxyl groups, such groups within the range of 1 to 3 can be bound to one silicon atom and the sum (a+Σb) is preferably within the range of 1 to 5. In cases where two or more hydrolyzable groups or hydroxyl groups are present in the reactive silyl group, they may be the same or different.

The reactive silyl group comprises one or more silicon atoms. In the case of silicon atoms connected via siloxane bonding or the like, the number thereof is preferably not more than 20.

In particular, reactive silyl groups of the general formula (2)

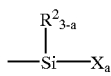

(2)

(wherein $R^2$, X and a are as defined above), are readily available and therefore are preferred.

The number of the reactive silyl groups per a saturated hydrocarbon polymer molecule is one and more and preferably within the range of 1.1 to 5. When the number of the reactive silyl groups per a molecule is less than one, the curability becomes insufficient and good rubber elasticity cannot be obtained in some instances.

The reactive silyl group may occur terminally and/or internally in the saturated hydrocarbon polymer molecule chain. In particular, it is preferred that the reactive silyl group occurs terminally within the molecule, because the number of effective network chains in the saturated hydrocarbon polymer component contained in the finally formed cured product becomes large, as a result the rubber-like cured product with high strength and high elongation is obtained easily.

Such reactive silyl group-containing saturated hydrocarbon polymer may comprise a single species or two or more species used in combination.

The polymer which constitutes the skeleton of the reactive silyl group-containing saturated hydrocarbon polymer to be used in the practice of the present invention can be prepared, for example, by (1) polymerizing an olefinic compound containing 1 to 6 carbon atoms, such as ethylene, propylene, 1-butene or isobutylene, as the main monomer or (2) homopolymerizing a diene compound such as butadiene or isoprene or copolymerizing a diene compound with the olefinic compound mentioned above and then hydrogenating the homo- or copolymer. Isobutylene polymers and hydrogenated polybutadiene-based polymers are preferred since functional groups can readily be introduced terminally thereinto, the molecular weight thereof can be easily controlled and the number of terminal functional groups can be increased.

The isobutylene polymers may be wholly composed of isobutylene monomer units or may contain monomer units copolymerizable with isobutylene preferably in a proportion of not more than 50% (% by weight; hereinafter the same shall apply), more preferably not more than 30%., most preferably not more than 10% based on the isobutylene polymer.

As such monomer components, there may be mentioned olefins containing 4 to 12 carbon atoms, vinyl ethers, aromatic vinyl compounds, vinylsilanes, allylsilanes and the like. As such copolymer components, there may be mentioned, for example, 1-butene, 2-butene, 2-methyl-1-butene, 3-methyl-1-butene, pentene, 4-methyl-1-pentene, hexene, vinylcyclohexene, methyl vinyl ether, ethyl vinyl ether, isobutyl vinyl ether, styrene, α-methylstyrene, dimethylstyrene, monochlorostyrene, dichlorostyrene, β-pinene, indene, vinyltrichlorosilane, vinylmethyldichlorosilane, vinyldimethylchlorosilane, vinyldimethylmethoxysilane, vinyltrimethylsilane, divinyldichlorosilane, divinyldimethoxysilane, divinyldimethylsilane, 1,3-divinyl-1,1,3,3-tetramethyldisiloxane, trivinylmethylsilane, tetravinylsilane, allyltrichlorosilane, allylmethyldichlorosilane, allyldimethylchlorosilane, allyldimethylmethoxysilane, allyltrimethylsilane, diallyldichlorosilane, diallyldimethoxysilane, diallyldimethylsilane, γ-methacryloyloxypropyltrimethoxysilane, γ-methacryloyloxypropylmethyldimethoxysilane and the like.

When a vinylsilane or allylsilane is used as the monomer copolymerizable with isobutylene, an increased silicon content is obtained, hence the number of groups capable of acting as silane coupling agent increases, with the result that the adhesive property of the resulting composition is improved.

Like the isobutylene polymers mentioned above, hydrogenated polybutadiene polymers and other saturated hydrocarbon polymers may also contain monomer units other than the monomer units serving as main components.

The reactive silyl group-containing saturated hydrocarbon polymer to be used in the practice of the present invention may further contain a monomer unit retaining a double bond after polymerization, for example a polyene compound such as butadiene or isoprene, in a minor proportion, preferably not more than 10%, more preferably not more than 5%, most preferably not more than 1%, on the condition that the objects of the present invention can be achieved.

It is preferred that the saturated hydrocarbon polymer, preferably an isobutylene polymer or hydrogenated polybutadiene-based polymer, have a number average molecular weight of about 500 to 50,000. For reasons of ease in handling and other reasons, it is particularly preferred that said polymer have a molecular weight of about 1,000 to 30,000 and occur as a liquid or have fluidity.

A method of producing reactive silyl group-containing saturated hydrocarbon polymers is now described.

Among reactive silyl group-containing isobutylene polymers, those isobutylene polymers having a reactive silyl group at the termini of the molecule can be produced by using an isobutylene polymer of the terminal function type, preferably of the both-end terminal function type, obtained by a polymerization method called inifer process (cation polymerization using a specific compound called inifer which serves simultaneously as an initiator and as a chain transfer agent). For example, a polyisobutylene terminally having an unsaturated group is prepared by the dehydrogenation reaction of said polymer or by such a reaction for unsaturated group introduction into polymers as described in Japanese Kokai Publication Sho-63-105005, for instance, and then reacted with a hydrosilane compound of the general formula

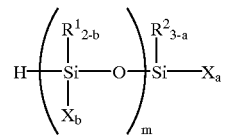

(wherein $R^1$, $R^2$, X, a and b are as defined above) (said hydrosilane compound is a compound composed of the group of general formula (1) and a hydrogen atom bound thereto), preferably a hydrosilane compound of the general formula

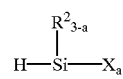

(wherein $R^2$, X and a are as defined above), in the manner of addition reaction called hydrosilylation using a platinum catalyst, to thereby introduce the reactive silyl group into the polymer. The hydrosilane compound includes, but is not limited to, halogenated silanes such as trichlorosilane, methyldichlorosilane, dimethylchlorosilane and phenyldichlorosilane; alkoxysilanes such as trimethoxysilane, triethoxysilane, methyldiethoxysilane, methyldimethoxysilane and phenyldimethoxysilane; acyloxysilanes such as methyldiacetoxysilane and phenyldiacetoxysilane; and ketoximatosilanes such as bis(dimethylketoximato) methylsilane and bis(cyclo-hexylketoximato)methylsilane. Among these, halogenated silanes and alkoxysilanes are preferred.

Such production methods are described, for example, in Japanese Kokoku Publication Hei-4-69659, Japanese Kokoku Publication Hei-7-108928, Japanese Kokai Publication Sho-63-254149, Japanese Kokai Publication Sho-64-22904 and Japanese Patent No. 2539445.

An isobutylene polymer containing a reactive silyl group internally in the molecular chain is produced by adding a reactive silyl group-containing vinylsilane or allylsilane to the monomer composition mainly comprising isobutylene and subjecting the mixture to copolymerization.

An isobutylene polymer containing reactive silyl groups terminally and internally in the molecular chain can be produced by copolymerizing, in the step of polymerization for preparing an isobutylene polymer containing a reactive silyl group terminally in the molecular chain, a reactive silyl group-containing vinylsilane or allylsilane with monomeric isobutylene, which is the main component, and then introducing a reactive silyl group terminally into the copolymer.

As the reactive silyl group-containing vinylsilane or allylsilane, there may be mentioned, for example, vinyltrichlorosilane, vinylmethyldichlorosilane, vinyldimethylchlorosilane, vinyldimethylmethoxysilane, divinyldichlorosilane, divinyldimethoxysilane, allyltrichlorosilane, allylmethyldichlorosilane, allyldimethylchlorosilane, allyldimethylmethoxysilane, diallyldichlorosilane, diallyldimethoxysilane, γ-methacryloyloxypropyltrimethoxysilane and γ-methacryloyloxypropylmethyldimethoxysilane.

The above-mentioned hydrogenated polybutadiene-based polymer having a terminal olefin group can be produced, for example, by first converting the hydroxyl group of a hydroxy-terminated hydrogenated polybutadiene-based polymer to an oxymetal group such as -ONa or -OK and then reacting said group with an organohalogen compound of the general formula

$$CH_2=CH-R^3-Y \qquad (3)$$

(wherein Y is a halogen atom such as a chlorine or iodine atom, and $R^3$ is a divalent organic group of the formula $—R^4—$, $—R^4—OCO—$ or $—R^4—CO—$ (in which $R^4$ is a divalent hydrocarbon group containing 1 to 20 carbon atoms, preferably an alkylene, cycloalkylene, arylene or aralkylene group), most preferably a divalent group selected from among $—CH_2—$ and $—R''—C_6H_5—CH_2—$ ($R''$ is a hydrocarbon group containing 1 to 10 carbon atoms)).

As the method of converting the terminal hydroxyl group of the hydroxy-terminated hydrogenated polybutadiene-based polymer to an oxymetal group, there may be mentioned the method comprising reacting said polymer with an alkali metal such as Na or K; a metal hydride such as NaH; a metal alkoxide such as $NaOCH_3$; an alkali hydroxide such as NaOH or KOH: or the like.

The method mentioned above gives a olefin-terminated hydrogenated polybutadiene-based polymer nearly equal in molecular weight to the hydroxy-terminated hydrogenated polybutadiene-based polymer used as the starting material. For obtaining a polymer with a higher molecular weight, the reaction with a polyvalent organohalogen compound containing two or more halogen atoms per a molecule, such as methylene chloride, bis(chloromethyl)benzene or bis (chloromethyl) ether, prior to the reaction with the organohalogen compound of general formula (3), can lead to an increased molecular weight. The subsequent reaction with the organohalogen compound of general formula (3) can give a terminal olefin group-containing hydrogenated polybutadiene-based polymer having a still higher molecular weight.

As typical examples of the above-mentioned organohalogen compound of general formula (3), there may be mentioned allyl chloride, allyl bromide, vinyl(chloromethyl) benzene, allyl(chloromethyl)benzene, allyl(bromomethyl) benzene, allyl (chloromethyl) ether, allyl(chloromethoxy) benzene, 1-butenyl chloromethyl ether, 1-hexenyl (chloromethoxy)benzene, allyloxy(chloromethyl)benzene and the like. These are, however, nonlimitative examples. Among them, allyl chloride is preferred since it is unexpensive and can react with ease.

The introduction of a reactive silyl group into the olefin-terminated hydrogenated polybutadiene-based polymer mentioned above can be effected in the same manner as in the case of the isobutylene polymer containing a reactive silyl group terminally in the molecular chain, by the addition reaction of a hydrosilane compound using a platinum catalyst.

In cases where the reactive silyl group-containing saturated hydrocarbon polymer molecules are substantially free of unsaturated bonds other than aromatic rings, markedly improved weathering resistance can be attained as compared with conventional sealants comprising a rubber-based polymer such as an unsaturated bond-containing organic polymer or an oxyalkylene polymer. Furthermore, said polymer, which is a hydrocarbon polymer, gives a cured product which has good water resistance and is low in a moisture barrier property.

The content of the reactive silyl group-containing saturated hydrocarbon polymer in the curable composition of the present invention is preferably not less than 10%, more preferably not less than 20%, most preferably not less than 30%.

The silane coupling agent, which is component (B) in the composition of the present invention, increases the strength of the bond between the adherend or substrate and the cured product comprising the reactive silyl group-containing saturated hydrocarbon polymer. The silane coupling agent is a compound having a group containing a silicon atom with a hydrolyzable group bound thereto (hereinafter referred to as "hydrolyzable silyl group") and another functional group. As examples of the hydrolyzable silyl group, there may be mentioned those groups of general formula (1) in which X is a hydrolyzable group. More specifically, there may be mentioned those groups mentioned hereinabove as examples of the hydrolyzable group. From the viewpoint of the rate-of-hydrolysis, methoxy, ethoxy and the like are preferred. The number of hydrolyzable groups is preferably not less than 2, more preferably not less than 3.

As the functional group other than the hydrolyzable silyl group, there may be mentioned primary, secondary or tertiary amino groups, a mercapto group, an epoxy group, a carboxyl group, a vinyl group, an isocyanate group, an isocyanurate group, halogens and the like. Among these, primary, secondary or tertiary amino groups, an epoxy group, an isocyanate group and an isocyanurate group are preferred, and an isocyanate group and an epoxy group are particularly preferred.

As typical examples of the silane coupling agent, there may be mentioned amino-containing silanes such as γ-aminopropyltrimethoxysilane, γ-aminopropyltriethoxysilane, γ-aminopropylmethyldimethoxysilane, γ-aminopropylmethyldiethoxysilane, γ-(2-aminoethyl)-aminopropyltrimethoxysilane, γ-(2- aminoethyl)-aminopropylmethyldimethoxysilane, γ-(2-aminoethyl)-aminopropyltriethoxysilane, γ-(2-aminoethyl)-aminopropylmethyldiethoxysilane, γ-ureidopropyltrimethoxysilane, N-phenyl-γ-aminopropyltrimethoxysilane, N-benzyl-γ-aminopropyltrimethoxysilane and N-vinylbenzyl-γ-aminopropyltriethoxysilane; mercapto-containing silanes such as γ-mercaptopropyltrimethoxysilane, γ-mercaptopropyltriethoxysilane, γ-mercaptopropylmethyldimethoxysilane and γ-mercaptopropylmethyldiethoxysilane; epoxy-containing silanes such as γ-glycidoxypropyltrimethoxysilane, γ-glycidoxypropyltriethoxysilane, γ-glycidoxypropyl-methyldimethoxysilane, β-(3,4-epoxycyclohexyl)-ethyltrimethoxysilane and β-(3,4-epoxycyclohexyl)-ethyltriethoxysilane; carboxysilanes such as β-carboxyethyltriethoxysilane, β-carboxyethylphenylbis(2-methoxyethoxy)silane and N-β-(carboxymethyl) aminoethyl-γ-aminopropyltrimethoxysilane; vinyl-type unsaturated group-containing silanes such as vinyltrimethoxysilane, vinyltriethoxysilane, γ-methacryloyloxypropylmethyl-dimethoxysilane and γ-acryloyloxypropylmethyl-triethoxysilane; halogen-containing silanes such as γ-chloropropyltrimethoxysilane; isocyanurate silanes such as tris(trimethoxysilyl) isocyanurate; and isocyanate-containing silanes such as γ-isocyanatepropyltrimethoxysilane, γ-isocyanatepropyltriethoxysilane, γ-isocyanatepropyl-methyldiethoxysilane and γ-isocyanatepropyl-methyldimethoxysilane. Derivatives of these as resulting from modification, such as amino-modified silyl polymers, silylated amino polymers, unsaturated aminosilane complexes, blocked isocyanatesilanes, phenylamino long-chain alkylsilanes, aminosilylated silicones and silylated polyesters can also be used as silane coupling agent.

The silane coupling agent used in the present invention is used in an amount within the range of 0.1 to 20 parts per 100 parts by weight of the reactive silyl group-containing saturated hydrocarbon polymer. In particular, the use thereof in an amount of 0.5 to 10 parts is preferred. The silane coupling agent may comprise one single species or two or more species used in admixture.

The composition of the present invention may further contain a tackifier other than the silane coupling agent.

In the curable composition of the present invention, a compound containing, within the molecule thereof, an unsaturated group capable of polymerizing upon reaction with atmospheric oxygen and/or a photopolymerizing substance is used as component (C) for increasing the weathering-resistant adhesive property. Each of these can produce the desired effect even when used singly. It is also possible to use them combinedly.

Among the above-mentioned components (C), the compound containing, within the molecule thereof, an unsaturated group capable of polymerizing upon reaction with atmospheric oxygen is, in other words, a substance capable of oxidative polymerization.

Typical examples of the substance capable of oxidative polymerization are ester compounds from an unsaturated higher fatty acid and an alcohol, diene polymers and copolymers such as 1,2-polybutadiene, 1,4-polybutadiene and $C_5$ to $C_8$-dienes, and, further, various modifications of such polymers or copolymers (maleinated modifications, boiled oil modifications, etc.), among others.

The reactivity in oxidative polymerization is influenced by the reaction temperature, humidity, light. additives and other factors. Therefore, it is conceivable that when a compound containing, within the molecule thereof, an unsaturated group capable of polymerizing upon reaction with atmospheric oxygen is added as component (C), the component (C), upon light irradiation, can form a still harder coat film on the surface of adhesion to an adherend, such as glass, and therefore can more strongly serve as a weathering-resistant adhesive property improver. The initial bond strength will not be lowered, however.

When an ester compound mainly composed of an ester of an unsaturated higher fatty acid with an alcohol is used as component (C), the weathering-resistant adhesive property in various glass products, such as heat ray-reflecting glass, is markedly improved. The unsaturated higher fatty acid component in the unsaturated higher fatty acid-alcohol ester preferably contains at least 10 carbon atoms per a molecule. The number of unsaturated groups and that of carboxyl groups may respectively exceed 1.

As typical examples of the above-mentioned unsaturated higher fatty acid ester compound, there may be mentioned ester compounds obtainable by condensation of an unsaturated higher fatty acid such as oleic acid, linolic acid, linolenic acid, eleostearic acid, licanic acid, ricinolic acid or arachidonic acid with an alcohol selected from among monohydric alcohols such as methanol and ethanol, dihydric alcohols such as ethylene glycol and propylene glycol, trihydric alcohols such as trimethylolpropane and glycerol, tetrahydric alcohols such as pentaerythritol, hexahydric alcohols such as sorbitol, organosilicon compounds containing a hydroxyl group via an organic group bound to the silicon atom, and the like.

In the oxidative polymerization reaction mentioned above, the reactivity of saturated fatty acid groups is significantly lower as compared with unsaturated fatty acid groups. It is known that, among unsaturated fatty acid groups, the reactivity increases in proportion to the number of double bonds and the extent of conjugation. Therefore, among the above-mentioned unsaturated higher fatty acid ester compounds, those having an iodine value of not less than 100 are preferred because of their high reactivity.

The above-mentioned unsaturated higher fatty acid ester compounds with an iodine value of not less than 100 may be produced by subjecting unsaturated higher fatty acids and alcohols to condensation reaction, as mentioned above. In practice, however, drying oils mainly composed of triglycerides, which are glycerol esters of unsaturated higher fatty acids, for example linseed oil, tung oil, soybean oil, hempseed oil, isano oil, lacquer (urushi) kernel oil, perilla oil, oiticica oil, kaya oil, walnut oil, poppy seed oil, cherry seed oil, pomegranate seed oil, safflower oil, tobacco seed oil, Chinese tallow kernel oil, rubber seed oil, sunflower seed oil, grape kernel oil, balsam seed oil and honewort seed oil, are preferred because of their unexpensiveness and ready availability.

These drying oils may contain ester compounds of unsaturated higher fatty acids containing not less than 10 carbon atoms, ester compounds of unsaturated fatty acids containing less than 10 carbon atoms, saturated fatty acid ester compounds, alcohols, unsaturated fatty acids, saturated fatty acids and the like. It is most preferred that ester compounds of unsaturated higher fatty acids containing not less than 10 carbon atoms account for 100% by weight on the drying oil basis. It is preferred that they account for at least 80% by weight.

Since, as mentioned above, the reactivity in the oxidative polymerization is proportional to the extent of conjugation in the unsaturated fatty acid group, those drying oils containing, as main components, triglyceride esters of conjugated unsaturated higher fatty acids such as eleostearic acid, licanic acid, punicic acid, canulpic acid and the like are highly reactive in the oxidative polymerization reaction and produce a higher weathering-resistant adhesive property improving effect, hence are most preferred. Typical examples of such drying oils containing conjugated unsaturated higher fatty acid triglycerides as main components are tung oil, oiticica oil, pomegranate seed oil and balsam seed oil.

Said compound containing, within the molecule thereof, an unsaturated group capable of polymerizing upon reaction with atmospheric oxygen may be used singly or two or more of such compounds may be used in combination.

Among the above-mentioned components (C), the photopolymerizable substance is, in other words, a compound having an unsaturated group capable of polymerizing as a result of activation of the double bond within the molecule upon light irradiation. Various substances are known as belonging to such category, for example organic monomers, oligomers, resins, and compositions containing these. In the practice of the present invention, any of commercially available substances of such kind can be used arbitrarily.

It is conceivable that when a photopolymerizable substance is added as component (C), the component (C), upon light irradiation, can form a hard coat film on the surface of adhesion to an adherend, such as glass, and thus serve as a weathering-resistant adhesive property improving agent. However, the initial bond strength is not lowered thereby.

As typical examples of the photopolymerizable unsaturated group contained in the photosensitive photopolymerizable resins, there may be mentioned vinyl group, allyl group, vinyl ether group, vinyl thioether group, vinylamino group, acetylenically unsaturated groups, acryloyl group, methacryloyl group, styryl group, cinnamoyl group and the like. Among these, acryloyl and methacryloyl are preferred because of high photoinitiation efficiency.

As examples of the photosensitive photopolymerizable resin containing an acryloyl or methacryloyl group as the photosensitive group, there may be mentioned acrylamide derivatives, methacrylamide derivatives, (meth)acrylates and the like. Among them, (meth)acrylates are preferred since various kinds of products are readily available. In the present specification, the term "(meth)acrylates" is used to collectively refer to acrylates and methacrylates.

When the photopolymerizable substance mainly composed of a (meth)acrylate is unifunctional, namely has only one photosensitive group (unsaturated group), it forms only a linear polymer on the occasion of photopolymerization. In the case of polyfunctional (meth)acrylates containing two or more photosensitive groups (unsaturated groups), photopolymerization and photocrosslinking occur simultaneously and give polymer molecules having a network structure, so that harder coat films can be formed on the adhesion surface, with the result that a high weathering-resistant adhesive property improving effect is produced. Polyfunctional (meth)acrylates are thus more preferred.

As typical examples of the polyfunctional (meth)acrylate, there may be mentioned propylene (or butylene or ethylene) glycol di(meth)acrylate, which contains two functional groups, trimethylolpropane tri(meth)acrylate and pentaerythritol tri(meth)acrylate, which contain three functional groups, and pentaerythritol tetra(meth)acrylate and dipentaerythritol penta- or hexa(meth)acrylate, which contain four or more functional groups. As typical examples of the oligomer, there may be mentioned oligoesters having a molecular weight of not more than 10,000, such as polyethylene glycol di(meth)acrylate and polypropylene glycol di(meth)acrylate. The number of unsaturated groups of the acrylic or methacrylic type is preferably not less than 2, more preferably not less than 3, per molecule. The larger the number of functional groups is, the higher the weathering-resistant adhesive property improving effect of said unsaturated acrylic compound is. The photopolymerizable substance may be used singly or two or more such substances may be used in combination.

When it is required that the weathering-resistant adhesive property improving effect be produced more reliably and more rapidly, further addition of a photosensitizer is effective.

The compound containing, within the molecule thereof, an unsaturated group capable of polymerizing upon reaction with atmospheric oxygen and/or the photopolymerizing substance, when used in the composition of the present invention, can markedly improve the weathering-resistant adhesive property of the curable composition containing the reactive silyl group-containing saturated hydrocarbon polymer. Moreover, the component (C) will not adversely influence on the physical properties of the cured product.

The level of addition of component (C) is preferably 0.1 to 20 parts, more preferably 1 to 10 parts, per 100 parts of component (A). When the addition level is below 0.1 part, the weathering-resistant adhesive property may be insufficient in certain instances. At an addition level exceeding 20 parts, the storage stability of the sealant composition may be low in some instances.

The curable composition of the present invention, which contains component (A) and component (C) undergoes curing of component (C) under the action of oxygen and/or light and, as a result, shows excellent adhesive property and weathering-resistant adhesive property against substrates as compared with the corresponding curable composition lacking in component (C). This characteristic is exhibited even when the composition does not contain any component (B). Nevertheless, the combined use of component (B) leads to the expression of still better adhesive property and weathering-resistant adhesive property.

The curable composition of the present invention may further contain various additives as necessary.

Examples of such additives are curing catalysts promoting the silanol condensation reaction, physical property modifiers for controlling the tensile characteristics of the resulting cured product, plasticizers, fillers, adhesion improvers, antioxidants, radical inhibitors, ultraviolet absorbers, metal deactivators, antiozonants, light stabilizers, phosphorus-containing peroxide decomposers, lubricants, pigments, blister agents and the like.

Typical examples of such additives are described, for example, in Japanese Kokoku Publications Hei-4-69659 and Hei-7-108928, and Japanese Kokai Publications Sho-63-254149 and Sho-64-22904.

When applied to various adherends, namely inorganic substrates such as glass, aluminum, stainless steel, zinc, copper and mortar, or organic substrates such as polyvinyl chloride, acrylics, polyesters, polyethylene, polypropylene and polycarbonates, the curable composition of the present invention shows a remarkable adhesive property improving effect under nonprimer or primer-treated conditions. When used under nonprimer conditions, the improving effect on the adhesion to various adherends is especially remarkable.

Further, the curable composition of the present invention, when applied to various glasses such as inorganic glass for general use (float glass), shows a remarkable weathering-resistant adhesive property improving effect and, when it is used as a sealing composition for heat ray-reflecting glass, the weathering-resistant adhesive property improving effect is particularly significant.

The heat ray-reflecting glass to which the curable composition of the present invention can be applied is a glass product given optical functions enabling it to reflect or absorb light at specific wavelengths as a result of coating the glass surface with a metal film, a metal nitride film, a metal oxide film or the like.

The effects of the unsaturated compound capable of reacting with atmospheric oxygen, which is used in accordance with the present invention, are observable even when various additives such as those mentioned above are added. Thus, when the curable composition of the present invention is used as an elastic sealant for building materials or a sealant for double layer glass or as an antirust, water-proof sealant for wire glass or double layer glass edges (cut edges), the addition of said compound can improve the adhesion of said sealant to various adherends and the weathering-resistant adhesive property as well.

nitrogen from one side of the three-way cock. Then, 0.093 g (1.0 mmol) of 2-methylpyridine was added. The polymerization was then initiated by adding 1.65 ml (15.1 mmol) of titanium tetrachloride. After a reaction period of 70 minutes, 1.22 g (10.8 mmol) of allyltrimethylsilane was added for the reaction for allyl group introduction into the polymer termini. After a reaction period of 120 minutes, the reaction mixture was washed with 200-ml of the water four times and then the solvents were distilled off to give an allyl-terminated isobutylene polymer.

Then, 40 g of the thus-obtained allyl-terminated isobutylene polymer was dissolved in 20 ml of n-heptane, the solution was warmed to about 70° C., methyldimethoxysilane (1.5 [eq. /vinyl group] and platinum (vinylsiloxane) complex ($1 \times 10^{-4}$ [eq./vinyl group]) were added and the hydrosilylation reaction was carried out. The reaction was monitored by FT-IR. The olefin-caused absorption at 1640 cm$^{-1}$ disappeared in about 4 hours.

Concentration of the reaction mixture under reduced pressure gave the desired isobutylene polymer having reactive silyl groups at both ends (the compound shown below).

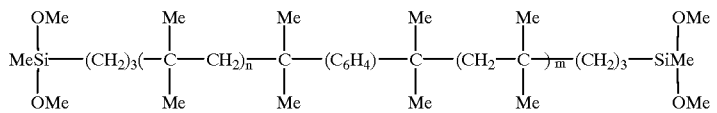

BEST MODES FOR CARRYING OUT THE INVENTION

The following examples illustrate the present invention in further detail. They are, however, by no means limitative of the scope of the present invention.

(Production Example)

A 500-ml glass pressure vessel was equipped with a three-way cock. After purging the vessel with nitrogen, the vessel was charged with 54 ml of ethylcyclohexane (dried by allowing to stand with molecular sieve 3A at least overnight), 126 ml of toluene (dried by allowing to stand with molecular sieve 3A at least overnight) and 1.16 g (5.02 mmol) of p-DCC (the compound shown below) using a syringe.

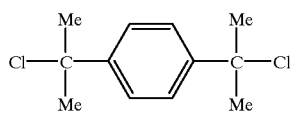

Then, a glass pressure tube for liquefied gas extraction with a needle valve and containing 56 ml of monomeric isobutylene was connected with the three-way cock. The polymerization vessel was cooled by dipping into a dry ice/ethanol bath at −70° C. and then evaluated by means of a vacuum pump. The needle valve was opened and the isobutylene monomer was introduced from the liquefied gas taking tube into the polymerization vessel. Thereafter, the pressure was returned to ordinary pressure by introducing The yield of the thus-obtained polymer was calculated based on the amount of the polymer obtained, the Mn and Mw/Mn were determined by the GPC method, and the terminal structure was determined by measuring and comparing the intensities of the resonance signals of protons ascribable to respective structures (protons of the initiator origin: 6.5 to 7.5 ppm; protons of methyl bound to the silicon atom of the polymer terminus origin: 0.0 to 0.1 ppm; and methoxy protons: 3.4 to 3.5 ppm) by $^1$H NMR analysis. The $^1$H-NMR analysis was carried out in CDCl$_3$ using Varian Gemini 300 (300 MHz for $^1$H).

The FT-IR was carried out using Shimadzu IR-408 and the GPC was carried out using Waters LC Module 1 as the feeding system and Shodex K-804 as the column. The molecular weight is given as a relative molecular weight relative to a polystyrene standard. The results of analysis of the polymer were as follows: Mn=11,400, Mw/Mn=1.23, Fn (silyl)=1.76 (the number average molecular weight being a polystyrene equivalent and the number of terminal silyl functions being the one per isobutylene polymer molecule).

(Examples 1 to 3 and Comparative Example 1 and 2)

A basic composition was prepared by thoroughly kneading, in a three-roll paint mill, 100 parts of the polymer obtained in Production Example, 90 parts of a paraffin-based process oil (trademark Diana Process PS-32, product of Idemitsu Kousan), 30 parts of ground calcium carbonate (trademark Snowlite SS, product of Maruo Calcium), 100 parts of precipitated calcium carbonate (trademark EDS-D10A, product of Shiraishi Kogyo), 100 parts of talc (trademark Talc LMR, product of Fuji Talc), 6 parts of Na$_2$SO$_4$.10H$_2$O, 6 parts of tung oil as compound of component (C) containing, within the molecule thereof, an unsaturated group capable of polymerizing upon reaction with atmospheric oxygen, 3 parts of dipentaerythritol penta- and hexaacrylate (trademark Aronix M400, product of Toa Gousei) and, further, one of tackifiers mentioned below in the amount specified in Table 1.

In Examples 1 to 3, a silane coupling agent which is component (B) according to the present invention [γ-glycidoxypropyltrimethoxysilane (trademark Silane Coupling Agent A-187, product of Nippon Unicar) and/or γ-isocyanatepropyltriethoxysilane (trademark Silane Coupling Agent Y-9030, product of Nippon Unicar)] was added as a tackifier in the amount specified in Table 1. In Comparative Example 1, no tackifier was added. In Comparative Example 2, 4 parts of an epoxy resin (trademark Epikote 828, product of Yuka Shell Epoxy), namely a tackifier containing no hydrolyzable silyl group (other than silane coupling agent) was added.

A curing agent was prepared by manually kneading, in a disposable cup, 10 parts of a paraffin-based process oil (trademark Diana Process PS-32, product of Idemitsu Kousan), 20 parts of ground calcium carbonate (trademark Snowlite SS, product of Maruo Calcium), 4 parts of a curing catalyst (trademark U-220, product of Nitto Kasei) and 2.5 parts of carbon black (trademark CB#30, product of Mitsubishi Chem.), followed by three repetitions of a procedure comprising stirring the mixture at a velocity of 10,000 rpm for 10 minutes using an Excel Auto homogenizer produced by Nippon Seiki Seisakusho.

According to the method of preparing test specimens for tensile bond strength testing as prescribed in JIS A 5758-1992, test samples were prepared by assembling glass substrates into an H-shaped body, thoroughly kneading the above-mentioned basic composition and curing agent at a weight ratio of 12:1 and filling the resulting composition into said body while bursting bubbles occurring therein by pressing them with a spatula, and causing curing in an oven. The aging conditions were always as follows: 23° C.×1 day+50° C.×5 days. The substrates used for H-shape tensile testing were float glass sheets (product of Koensha: approved by the Japan Society of Sealing Material Manufacturers; size: 3×5×0.5 cm) according to JIS A 5758-1992 or heat ray-reflecting glass sheets coated with TiOx by thermal fusion bonding (trademark KLS, product of Central Glass; size: 5×5×0.6 cm). Prior to filling the composition, these adherends were washed with methyl ethyl ketone (product of Waku Pure Chemical; special reagent grade) and wiped with a clean cotton cloth. No primer was applied.

The cured products for H-shape tensile testing prepared in the above manner were subjected, after curing, to tensile bond strength testing, and the adhesive property characteristics relative to various adherends in nonprimer conditions were evaluated by comparison in terms of tensile characteristics and mode of failure. The tensile bond strength testing was carried out according to the method of tensile bond strength testing as prescribed in JIS A 5758-1992 in a constant-temperature room maintained at a temperature of 23° C. and a humidity of 50±10% at a rate of pulling of 50 mm/min, using Shimadzu Autograph AG-2000A. The proportions of cohesive failure (CF), thin-layer cohesive failure (TCF) and adhesion failure (AF) shown in Table 1 are the proportions judged by macroscopic observation of faces at failure after tensile testing. The results are shown in Table 1.

TABLE 1

| No | Tackifier (parts add) | Adherend | 50% tensile stress (kgf/cm$^2$) | Maximum tensile stress (kgf/cm$^2$) | Elongation at maximum load (%) | Mode of failure (%) | | |
|---|---|---|---|---|---|---|---|---|
| | | | | | | CF | TCF | AF |
| Comparative example 1 | None (0 parts) | Float glass | — | 1.0 | 20 | 0 | 0 | 100 |
| | | Heat ray-reflecting glass: KLS | — | 1.0 | 21 | 0 | 0 | 100 |
| Comparative example 2 | Epikote 828 (4 parts) | Float glass | — | 0.7 | 15 | 0 | 0 | 100 |
| | | Heat ray-reflecting glass: KLS | — | 0.7 | 12 | 0 | 0 | 100 |
| Example 1 | A-187 (4 parts) | Float glass | 2.6 | 5.2 | 156 | 100 | 0 | 0 |
| | | Heat ray-reflecting glass: KLS | 2.8 | 5.0 | 138 | 100 | 0 | 0 |
| Example 2 | Y-9030 (4 parts) | Float glass | 4.9 | 6.0 | 75 | 100 | 0 | 0 |
| | | Heat ray-reflecting glass: KLS | 4.8 | 5.5 | 66 | 100 | 0 | 0 |
| Example 3 | A-187 (2 parts) + Y-9030 (4 parts) | Float glass | 4.2 | 5.9 | 88 | 100 | 0 | 0 |
| | | Heat ray-reflecting glass: KLS | 4.2 | 5.5 | 77 | 100 | 0 | 0 |

CF: Cohesive failure, TCF: Thin-layer cohesive failure, AF: Adhesion failure

As shown in Table 1, the bond strength was low relative to various adherends such as float glass and heat ray-reflecting glass under nonprimer conditions when no tackifier was added (Comparative Example 1). The addition of γ-glycidoxypropyltrimethoxysilane (A-187) and/or γ-isocyanatepropyltriethoxysilane (Y-9030) (Examples 1 to 3) successfully resulted in improvements in bond strength relative to various adherends even under nonprimer conditions. When the epoxy resin (Epikote 828), a hydrolyzable silyl group-free coupling agent, was added as a tackifier (Comparative Example 2), the bond strength was low relative to various adherends. It was thus revealed that silane coupling agent, in particular, are effective as tackifiers.

Based on the above findings, it can be established that the adhesive property, in nonprimer conditions, of the curable composition comprising a saturated hydrocarbon polymer containing, within the molecule thereof, at least one reactive silyl group to various adherends can be improved by adding a silane coupling agent.

(Examples 4 to 7 and Comparative Example 3)

To 100 parts of the polymer obtained in Production Example, there were added 90 parts of a paraffin-based process oil (trademark Diana Process PS-32, Product of Idemitsu Kousan), 30 parts of ground calcium carbonate (trademark Snowlite SS, product of Maruo Calcium), 100 parts of precipitated calcium carbonate (trademark EDS-D10A, product of Shiraishi Kogyo), 100 parts of talc (trademark Talc LMR, product of Fuji Talc), 6 parts of Na$_2$SO$_4$.10H$_2$O, 3 parts of nickel dimethyldithiocarbamate, a light stabilizer (trademark Sandant NBC, product of Sanshin Chem.), 3 parts of [2,2'-thiobis(4-t-octylphenolate)] nickel-n-butylamine complex (trademark CYASORB UV-1084, product of ACC), 1 part of an antioxidant (trademark Irganox 1010, product of Ciba-Geigy), 1 part of an ultraviolet absorber (trademark Tinuvin 327, product of Ciba-Geigy), 1 part of a light stabilizer (trademark Sanol LS-770, product of Sankyo), and 2 parts of γ-glycidoxypropyltrimethoxysilane (trademark Silane Coupling Agent A-187, product of Nippon Unicar) and 4 parts of γ-isocyanatepropyltriethoxysilane (trademark Silane Coupling Agent Y-9030, product of Nippon Unicar), both as silane coupling agent, as components (B). Further, as components (C) of the present invention, tung oil was added as the compound containing, within the molecule thereof, an unsaturated group capable of polymerizing upon reaction with atmospheric oxygen, and dipentaerythritol penta- and hexaacrylate (trademark Aronix M400, product of Toa Gousei) as the photopolymerizable substance, respectively in the amounts specified in Table 2. The mixture was thoroughly kneaded in a three-roll paint mill to give a basic composition.

A curing agent was prepared by manually kneading 10 parts of a paraffin-based process oil (trademark Diana Process PS-32, product of Idemitsu Kousan), 20 parts of ground calcium carbonate (trademark Snowlite SS, product of Maruo Calcium), 4 parts of a curing catalyst (trademark U-220, product of Nitto Kasei) and 2.5 parts of carbon black (trademark CB#30, product of Mitsubishi Chem.), followed by three repetitions of a procedure comprising stirring the mixture at a velocity of 10,000 rpm for 10 minutes using an Excel Auto homogenizer (product of Nippon Seiki Seisakusho).

Samples for H-shape tensile testing were prepared in the same manner as mentioned above except that the aging conditions were as follows: 23° C.×7 days+50° C.×7 days.

The samples for H-shape tensile testing as prepared in the above manner were placed in a Suga Shikenki model, sunshine superlong life weatherometer WEL-SUN-HC, where sunshine carbon was used as the light source and the black panel temperature was set at 63° C. After the specified period of exposure in the weatherometer (SWOM) shown in Table 2, the samples were taken out and subjected to tensile bond strength testing, and the weathering-resistant adhesive property characteristics were evaluated by comparison in terms of tensile characteristics and mode of failure. The results are shown in Table 2.

For comparison, the same samples for H-shape tensile testing as prepared by the method mentioned above were subjected to tensile adhesive property testing prior to the weathering resistance test. The results are shown in Table 3.

TABLE 2

| No | Unsaturated compound reactive with atmospheric oxygen (parts added) | Photopolymerizable substance (parts add) | Adherend | SWOM exposure time (hrs) | 50% tensile stress (kgf/cm$^2$) | Maximum tensile stress (kgf/cm$^2$) | Elongation at maximum load (%) | Mode of failure (%) | | |
|---|---|---|---|---|---|---|---|---|---|---|
| | | | | | | | | CF | TCF | AF |
| Comparative example 3 | None (0 parts) | None (0 parts) | | 3000 | 5.9 | 7.3 | 73 | 100 | 100 | 0 | 0 |
| | | | | 500 | 5.2 | 6.0 | 63 | 0 | 0 | 0 | 100 |
| Example 4 | None (0 parts) | Aronix M400 (3 parts) | | 3000 | 7.3 | 8.3 | 68 | 100 | 100 | 0 | 0 |
| | | | | 500 | 6.3 | 6.8 | 62 | 70 | 70 | 0 | 30 |
| Example 5 | None (0 parts) | Aronix M400 (6 parts) | | 500 | 6.1 | 6.1 | 51 | 50 | 50 | 0 | 50 |
| Example 6 | Tung oil (6 parts) | None (0 parts) | | 3000 | 6.0 | 7.4 | 71 | 100 | 100 | 0 | 0 |
| | | | | 1000 | 5.8 | 6.9 | 70 | 100 | 100 | 0 | 0 |
| Example 7 | Tung oil (6 parts) | Aronix M400 (3 parts) | | 3000 | 6.2 | 7.2 | 68 | 100 | 100 | 0 | 0 |
| | | | | 1000 | 6.0 | 6.9 | 66 | 100 | 100 | 0 | 0 |

CF: Cohesive failure, TCF: Thin-layer cohesive failure, AF: Adhesion failure

TABLE 3

| No | Unsaturated compound reactive with atmospheric oxygen (parts added) | Photopolymerizable substance (parts added) | Adherend | 50% tensile stress (kgf/cm$^2$) | Maximum tensile stress (kgf/cm$^2$) | Elongation at maximum load (%) | Mode of failure (%) | | |
|---|---|---|---|---|---|---|---|---|---|
| | | | | | | | CF | TCF | AF |
| Comparative example 3 | None (0 parts) | None (0 parts) | Float glass | 5.1 | 5.9 | 68 | 97 | 3 | 0 |
| | | | Heat ray-reflecting glass: KLS | 5.9 | 7.1 | 73 | 100 | 0 | 0 |
| Example 4 | None | Aronix | Float glass | 5.8 | 6.3 | 62 | 98 | 2 | 0 |

TABLE 3-continued

| No | Unsaturated compound reactive with atmospheric oxygen (parts added) | Photopolym erizable substance (parts added) | Adherend | 50% tensile stress (kgf/cm$^2$) | Maximum tensile stress (kgf/cm$^2$) | Elongation at maximum load (%) | Mode of failure (%) | | |
|---|---|---|---|---|---|---|---|---|---|
| | | | | | | | CF | TCF | AF |
| | (0 parts) | M400 (3 parts) | Heat ray-reflecting glass: KLS | 7.0 | 7.2 | 55 | 98 | 2 | 0 |
| Example 5 | None (0 parts) | Aronix M400 (6 parts) | Heat ray-reflecting glass: KLS | 7.6 | 8.0 | 58 | 100 | 0 | 0 |
| Example 6 | Tung oil (6 parts) | None (0 parts) | Float glass | 6.5 | 7.3 | 65 | 100 | 0 | 0 |
| | | | Heat ray-reflecting glass: KLS | 6.4 | 7.1 | 62 | 100 | 0 | 0 |
| Example 7 | Tung oil (6 parts) | Aronix M400 (3 parts) | Float glass | 6.6 | 7.2 | 59 | 100 | 0 | 0 |
| | | | Heat ray-reflecting glass: KLS | 6.7 | 7.2 | 58 | 100 | 0 | 0 |

CF: Cohesive failure, TCF: Thin-layer cohesive failure, AF: Adhesion failure

As shown in Table 2, in all the cases (Comparative Example 3, Examples 4 to 7) where float glass, which is a common glass species, was used as the adherend, the failure was 100% cohesive failure even after 3,000 hours of exposure in the SWOM. On the other hand, when the heat ray-reflecting glass; KLS, which is refractory to adhesion, was used as the adherend, 100% adhesion failure was observed after 500 hours of exposure in the SWOM in Comparative Example 3, indicating that the weathering-resistant adhesive property of the corresponding composition was insufficient relative to the heat ray-reflecting glass. On the contrary, it was revealed that the addition of the compound containing, within the molecule, an unsaturated group capable of polymerizing upon reaction with atmospheric oxygen (tung oil) as component (C) according to the present invention and/or the photopolymerizable substance (Aronix M400), (Examples 4 to 7) resulted in good weathering-resistant adhesion to the heat ray-reflecting glass and in an increase in the proportion of cohesive failure. As can be seen from comparison of the 50% tensile stress, maximum tensile stress and elongation at maximum load data, the addition of component or components (C) in accordance with the present invention does not adversely affect the physical properties of the cured products.

As mentioned hereinabove, the curable composition comprising (A) a saturated hydrocarbon polymer containing at least one reactive silyl group within the molecule, (B) a silane coupling agent and (C) a compound containing, within the molecule, an unsaturated group capable of polymerizing upon reaction with atmospheric oxygen and/or a photopolymerizable substance can simultaneously satisfy concerning the adhesion to various adherends and the weathering-resistant adhesive property to glass substrates.

INDUSTRIAL APPLICABILITY

With the curable composition of the present invention, the adhesion to various adherends and the weathering-resistant adhesive property to various glass substrates, in particular to heat ray-reflecting glass substrates, can markedly be improved. When various additives are added to the curable composition of the present invention, the resulting composition is particularly useful as an elastic sealant, which is required to have good adhesiveness to various adherends such as a sealant for double layer glass products or a sealant for use in the process of SSG, and weathering-resistant adhesiveness to glass substrates.

We claim:

1. A curable composition which comprises (A) a saturated hydrocarbon polymer containing at least one silicon-containing group having a hydroxyl group or hydrolyzable group bound to the silicon atom and capable of crosslinking by forming a siloxane bond, (B) a silane coupling agent having a hydrolyzable silyl group and another functional group and (C) a compound containing, within the molecule thereof, an unsaturated group capable of polymerizing upon reaction with atmospheric oxygen and/or a photopolymerizing substance.

2. A curable composition according to claim 1, wherein the saturated hydrocarbon polymer, namely component (A), has a number average molecular weight of 500 to 50,000 and has, in the main chain and/or in a side chain or side chains thereof, at least one terminal silyl group of the general formula (1), per a molecule

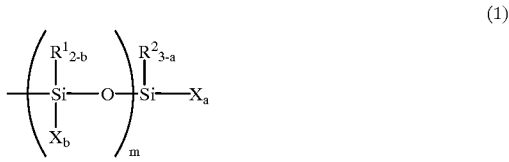

wherein $R^1$ and $R^2$ each independently is an alkyl group containing 1 to 20 carbon atoms, an aryl group containing 6 to 20 carbon atoms, an aralkyl group containing 7 to 20 carbon atoms or a triorganosiloxy group of the formula $(R')_3SiO$— in which each R' independently is a substituted or unsubstituted hydrocarbon group containing 1 to 20 carbon atoms, X's each independently is a hydroxyl group or a hydrolyzable group: a is 0, 1, 2 or 3 and b is 0, 1 or 2, exclusive of the case where a and b are simultaneously equal to 0; and m is 0 or an integer of 1 to 19.

3. A curable composition according to claim 2, wherein X is an alkoxyl group.

4. A curable composition according to claim 1, wherein the saturated hydrocarbon polymer is a polymer in which isobutylene-derived repeating units, when totaled, account for not less than 50% by weight.

5. A curable composition according to claim 1, wherein the silane coupling agent is an isocyanate-containing silane coupling agent and/or an epoxy-containing silane coupling agent.

6. A curable composition according to claim 1, wherein the compound containing, within the molecule thereof, an unsaturated group capable of crosslinking upon reaction with atmospheric oxygen, which serves as component (C), is an ester compound derived from an unsaturated higher fatty acid and an alcohol.

7. A curable composition according to claim 6, wherein the ester compound derived from an unsaturated higher fatty acid- and an alcohol is an ester compound derived from an unsaturated higher fatty acid having an iodine value of not less than 100 and an alcohol.

8. A curable composition according to claim 7, wherein the ester compound derived from an unsaturated higher fatty acid having an iodine value of not less than 100 and an alcohol is a drying oil.

9. A curable composition according to claim 8, wherein the drying oil is a triglyceride of a conjugated unsaturated higher fatty acid.

10. A curable composition according to claim 1, wherein the photopolymerizable substance, which serves as component (C), is an acrylate or a methacrylate.

11. A curable composition according to claim 1, which contains component (B) in an amount of 0.1 to 20 parts by weight and component (C) in an amount of 0.1 to 20 parts by weight, per 100 parts by weight of component (A).

12. A sealing composition for double layer glass which comprises the curable composition according to claim 1.

* * * * *